SIGNAL SWITCHING SYSTEM

Filed Oct. 6, 1958

INVENTORS
BERNARD M. GORDON
ERWIN H. STRAEHLEY
BY
ATTORNEY

United States Patent Office 3,152,319
Patented Oct. 6, 1964

3,152,319

SIGNAL SWITCHING SYSTEM

Bernard M. Gordon, Newton, and Erwin H. Strachley, Brookline, Mass., assignors to Epsco, Incorporated, Boston, Mass., a corporation of Massachusetts Filed Oct. 6, 1958, Ser. No. 765,653
5 Claims. (Cl. 340—147)

Figure 1:
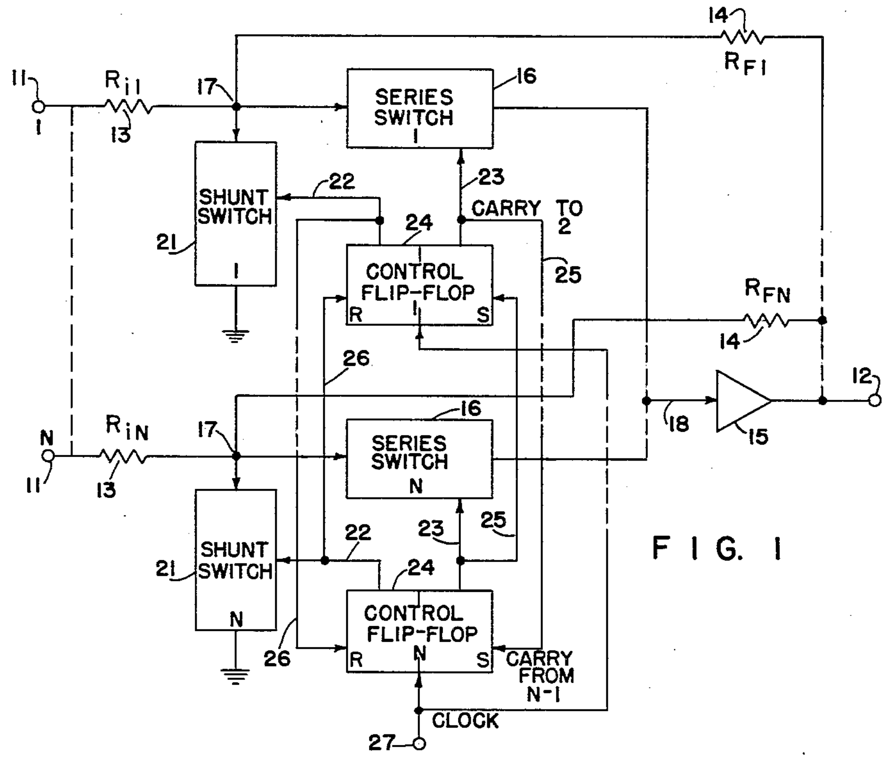

The present invention relates in general to multiplexing systems and more particularly concerns a novel switchable voltage transfer unit for selecting one from a number of voltage inputs and transferring it to the output, while keeping the effect of the other inputs negligible. This is accomplished with a high degree of linearity and accuracy for a wide range of inputs and environmental conditions.

Multiplexing techniques are frequently employed where a number of relatively slowly varying information input signals are to be conveyed through a single data translating link capable of translating data at a much higher rate than is present in the input signal variations. Typically, the input signals are sampled in sequence and delivered to the data translation link. In accordance with Shannon's sampling theorem, a perfect recovery of the input signals may be obtained if the sampling rate is at least twice that of the highest frequency present in the input signal variations. When sampling a few channels having relatively low highest frequencies, a mechanically operated commutating switch is often employed. Such switches are disadvantageous because their sampling rate is severely limited. Moreover, wear of the contacts seriously limits the life of a mechanical commutating switch which frequently becomes noisy before failing completely.

Electronic multiplexors overcome the disadvantages of limited speed and mechanical wear; however, prior art electronic multiplexors have a number of disadvantages. If semiconductor devices are used for selectively connecting an input channel to an output terminal, the finite back resistance of such devices provides incomplete isolation between channels and cross-talk is introduced in the output. A multiplexor consisting entirely of electron tubes is bulky, dissipates considerable power and introduces a significant amount of resistance between the input terminal of a selected channel and the output terminal.

Accordingly, the present invention contemplates and has as a primary object the provision of a high speed multiplexing system for accurately transmitting the input signal amplitude in a selected channel to an output while minimizing cross-talk, power consumption and bulk.

It is another object of the invention to achieve the principal object with semiconductor devices while minimizing the effects of nonlinearities in the semiconductor switches.

Broadly speaking, this is accomplished by switching in the feedback loop of an operational amplifier. More specifically, the system employs a single high gain amplifier for a number of input channels. Associated with each input channel is an input resistor connected from an input terminal and in series with a feedback resistor connected to the output of the high gain amplifier. A series switch connects the junction of the input and feedback resistors in the selected channel to the input of the high gain amplifier while a shunt switch in each unselected channel connects this junction to ground, thereby establishing an operational amplifier for providing the signal on the selected channel input terminal amplified on the output terminal.

A number of advantages result from this type of operation. The high degree of inverse feedback compensates for non-linearities in the series switches. Since the input to the switch is either servoed to ground by the amplifier or is shorted to ground by the shunt switch, the impedance presented to an input signal source is always the same and equal to the associated input resistance with respect to ground. Moreover, since the junction between input and feedback resistors of an unselected channel is clamped to ground, cross-talk in the system is minimized.

Figure 2:
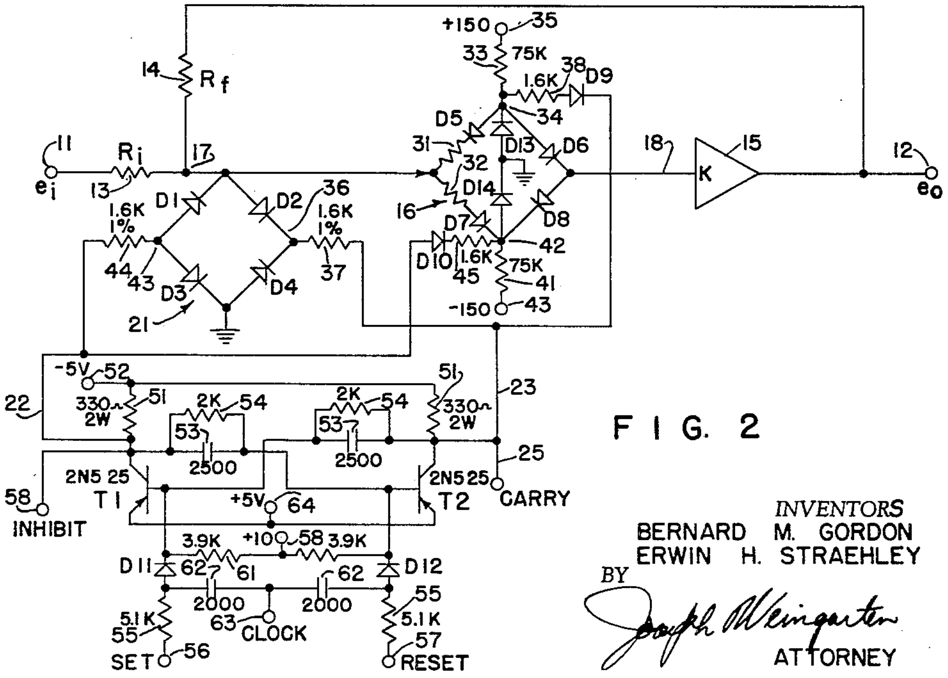

Other features, objects and advantages of the invention will become apparent from the following specification when read in connection with the accompanying drawing in which:

FIG. 1 is a block diagram illustrating the logical arrangement of the novel system; and FIG. 2 is a schematic circuit diagram of a preferred embodiment of the switches and control flip-flop associated with a channel.

With reference to the drawing, and more particularly FIG. 1 thereof, the logical arrangement of the system is shown. For each input signal there is an input terminal 11, the signal then on the selected terminal being provided on output terminal 12. An input resistor 13 and a feedback resistor 14 are connected in series between each input terminal 11 and output terminal 12. A high gain amplifier 15 has its output connected to output terminal 12.

Each channel has a series switch 16 between the junction 17 of input resistor 13 and feedback resistor 14 and the input line 18 of amplifier 15. Each channel also includes a shunt switch 21 between junction 17 and ground. Control signals for shunt switch 21 and series switch 16 are delivered over lines 22 and 23, respectively, from an associated control flip-flop 24 causing one switch to be opened while the other is closed. Carry and inhibit signals from control flip-flop 24 are respectively delivered over lines 25 and 26 to the set and reset inputs respectively of the control flip-flop associated with the next consecutive channel, control flip-flop N delivering carry and inhibit pulses to control flip-flop 1. All the control flip-flops 24 receive clock pulses cyclically delivered on terminal 27.

Operation is as follows: In the sequential multiplexor of this representative embodiment, the set state is shifted in sequence among the control flip-flops. A control flip-flop in the set state renders a series switch 16 closed and shunt switch 21 opened. At the same time, all other control flip-flops then in the reset state render all other shunt switches 21 closed and the series switches 16 open. With a series switch closed and a shunt switch opened, the signal on input terminal 11 is amplified by the operational amplifier which includes the input resistor 13, the feedback resistor 14 and amplifier 15. Meanwhile, the junction 17 in all other channels is prevented from affecting the output on terminal 12 because shunt switch 21 clamps these junctions to ground.

The next clock pulse delivered on terminal 27 resets the control flip-flop 24 then in the set state to the reset state, causing its shunt switch to be closed, and its series switch to be opened. This pulse also sets the control flip-flop 24 in the next channel. The control flip-flop 24 just set then delivers conditioning potentials rendering its associated shunt switch 21 open and series switch 16 closed so that the input signal on the input terminal 11 of this newly selected channel is delivered to output terminal 12.

Referring to FIG. 2, there is shown a preferred embodiment of the shunt and series switches 21 and 16 and control flip-flop 24. Shunt switch 21 comprises a bridge formed of diodes D1, D2, D3 and D4. Series switch 16 comprises a bridge formed of diodes D5, D6, D7 and D8, sections 31 and 32 of a balancing potentiometer being in series with junction 17 and diodes D5 and D7, respectively. A resistor 33 is connected between the junction 34 of series switch 16 and a source of positive potential applied on terminal 35. Junction 34 of series switch 16 is coupled to junction 36 of shunt switch 21 by diode D9 in series with resistors 37 and 38. A resistor 41 is connected between junction 42 of series switch 16 and a source of negative potential applied on terminal 43. Junction 42 is coupled to junction 43 of shunt switch 21 by diode D10 in series with resistors 44 and 45.

The junction of diodes D6 and D8 is connected to input line 18 of amplifier 15. The junction of diodes D3 and D4 is connected to ground. Diodes D13 and D14 are connected in series between junctions 34 and 42 and their junction grounded.

Line 22 from control flip-flop 24 is connected to the junction of resistor 44 and diode D10. Line 23 from control flip-flop 24 is connected to the junction of diode D9 and resistor 37.

Control flip-flop 24 comprises transistors T1 and T2 and associated components. The circuit is symmetrical. A load resistor 51 is connected in series between a source of negative potential applied on terminal 52 and respective collectors of transistors T1 and T2. Each collector is coupled to the other base by a pair of networks formed of capacitor 53 shunted by resistor 54. A network formed of diode D11 and resistor 55 is connected between the base of transistor T1 and the set input terminal 56. A like network formed of diode D12 in series with a resistor 55 is connected between the base of transistor T2 and the reset terminal 57. Each base is also connected to a source of positive potential on terminal 58 by resistor 61. A capacitor 62 is connected between each resistor 55 and a clock pulse terminal 63. The emitters of transistors T1 and T2 are connected to a source of positive potential on terminal 64, the potential on this terminal being less than that on terminal 58.

In explaining the mode of operation, it is convenient to assume flip-flop 24 in the reset state with transistors T1 and T2, respectively, conductive and non-conductive. At this time the collector of transistor T1 is positive with respect to ground while the collector of transistor T2 is substantially at the negative potential of terminal 52. It is seen that the potential developed between the collectors of transistors T1 and T2 is applied across shunt switch 21 through lines 22 and 23 and resistors 37 and 44 to render diodes D1, D2, D3 and D4 conductive and thereby clamp junction 17 to ground potential.

At the same time, junction 42 is clamped to the positive potential on the collector of transistor T1 by diode D10, while junction 34 is clamped to the negative potential on the collector of transistor T2 by diode D9 to insure that diodes D5, D6, D7 and D8 are non-conductive and junction 17 is not connected to the input of amplifier 15. The potential developed across junctions 34 and 42 renders diodes D13 and D14 conductive to insure that the potential developed across these junctions is independent of the reverse biased characteristics of the bridge diodes. This minimizes the influence of unselected channels on the input of amplifier 15.

Flip-flop 24 may be set by transmitting a positive pulse through diode D11 to the base of transistor T1 to render this transistor non-conductive. Its collector then falls to the negative potential on terminal 52, the fall being coupled by the network formed of capacitor 53 and resistor 54 to the base of transistor T2, rendering this transistor conductive and its collector then becomes positive.

The potential across junctions 36 and 43 is now reversed and diodes D1, D2, D3 and D4 are cut off to disconnect junction 17 from ground. At the same time, clamping diodes D9 and D10 no longer conduct and the potential across terminals 35 and 43 is applied across junctions 34 and 42 through resistors 33 and 41 to render diodes D5, D6, D7 and D8 conductive and diodes D13 and D14 non-conductive. This effectively couples junction 17 to input line 18 of amplifier 15 and allows the input signal on terminal 11 to be coupled to output terminal 12. Potentiometer 31 compensates for unbalance in diodes in series switch 16 and is adjusted so that junctions 17 and 18 are at ground potential when a selected input terminal 11 is grounded.

It is important to note that the switching is done inside the feedback loop of the operational amplifier so that the high degree of inverse feedback compensates for nonlinearity in the semi-conductor switches. The bridge type switches are advantageous since the balanced operation results in opposed junctions assuming substantially the same potential, thereby reproducing the input signal with great accuracy when the series switch is closed, and clamping the junction 17 very close to ground potential when shunt switch 21 is closed.

When the control flip-flops of the different channels form a ring counter, it is advantageous to apply the carry and inhibit signals from each stage to the set and reset inputs of the following stage so that the clock pulse applied to terminal 63 is passed by diode D11 but prevented from being passed by diode D12. Suitable means may be provided by familiar techniques for initially setting one control flip-flop while resetting all others at the beginning of a multiplexing cycle. Thereafter, the channels are sampled in sequence in response to each clock pulse.

If it is desired to employ addressed selection of a channel, the addressing signal may be applied directly to the set input 56 with the carry output of a control flip-flop being applied to its own reset input 57 as an inhibiting potential. Clock pulse input terminal 63 is then not utilized.

In a representative embodiment of the invention, the circuit parameters indicated in FIG. 2 were employed, resistances being in ohms and capacitances in micromicrofarads. In a multiplexing system, five channels of this type were sampled at a rate of 2 kc. with the accuracy of reproduction over a dynamic range of 10 volts being 0.1 percent of full scale, cross-talk in the selected channel being less than .01 percent of full scale output.

It is evident that those skilled in the art may now make numerous modifications of and departures from the specific embodiment described herein without departing from the inventive concepts. Consequently, the invention is to be construed as limited only by the spirit and scope of the appended claims.

What is claimed is:

1. A multiplexing system comprising:

(1) a high gain amplifier providing the system's output;

(2) a plurality of input signal channels, each channel having:

- (*a*) its input connected by an input resistor and a series switch to the input of the amplifier,
- (*b*) a feedback resistor connecting the amplifier's output to the end of the input resistor opposite the channel's input, and
- (*c*) a shunt switch arranged to connect the junction of the resistors to ground potential;

(3) and means controlling the switches whereby when the input of one channel is connected by its series switch to the amplifier's input, the inputs of all the other channels are grounded by their shunt switches.

2. Apparatus in accordance with claim 1 wherein the means controlling the switches includes a control device in each channel for selectively rendering either one of the series and shunt switches closed and simultaneously rendering the other switch open.

3. Apparatus in accordance with claim 2, and means for applying clock pulses to the control devices to cause the control devices to operate in a sequence whereby each channel is in turn connected to the amplifier's input.

4. Apparatus in accordance with claim 3, wherein the control device in each channel is a flip-flop, the flip-flops being arranged to form a ring counter whereby the flip-flop then causing a series switch to be closed is reset by a clock pulse to provide a signal rendering the following flip-flop in the sequence to be placed in the state causing its series switch to be closed.

5. A multiplexing system comprising:

(1) a high gain amplifier providing the system's output;

(2) a plurality of input signal channels, each channel having;

(a) an input resistor, (b) means for applying the channel's input signal at one end of the front resistor, (c) a feedback resistor connected between the amplifier's output and the other end of the input resistor, (d) a series switch comprising a bridge network having a diode in each of its four branches, the bridge circuit having opposed corners connected to the junction of the resistors an dthe input of the amplifier, (e) a shunt switch comprising a bridge network having a diode in each of its four branches, the bridge circuit having one corner connected to the junction of the resistors and the opposed corner connected to ground;

(3) and means controlling the switches whereby when the input of one channel is connected by its series switch to the amplifier's input, the inputs of all the other channels are grounded by their shunt switches.

References Cited in the file of this patent

UNITED STATES PATENTS

| | | |
|---|---|---|
| 2,445,840 | Rauch | July 27, 1948 |
| 2,563,589 | Den Hertog | Sept. 2, 1951 |
| 2,657,318 | Rack | Oct. 27, 1953 |
| 2,757,283 | Ingerson et al. | July 31, 1956 |
| 2,782,307 | Von Sivers et al. | Feb. 19, 1957 |
| 2,797,401 | Green et al. | June 25, 1957 |
| 2,803,703 | Sherwin | Aug. 20, 1957 |
| 2,813,262 | Garde et al. | Nov. 12, 1957 |
| 2,836,734 | Cichanowicz | May 27, 1958 |
| 2,850,649 | Schroeder | Sept. 2, 1958 |
| 2,863,049 | Lee et al. | Dec. 2, 1958 |
| 2,863,139 | Michelson | Dec. 2, 1958 |
| 2,866,103 | Blake et al. | Dec. 23, 1958 |
| 2,928,900 | Pawley | Mar. 15, 1960 |

OTHER REFERENCES

"Electronic Analog Computers," by G. Korn et al., 2nd ed., McGraw-Hill Book Co., 1956, pages 264 and 347.

Millman, J., and Taub, H.: "Pulse and Digital Circuits," McGraw-Hill Book Co., N. Y., 1956, pages 24–27.

UNITED STATES PATENT OFFICE

CERTIFICATE OF CORRECTION

Patent No. 3,152,319 October 6, 1964

Bernard M. Gordon et al.

It is hereby certified that error appears in the above numbered patent requiring correction and that the said Letters Patent should read as corrected below.

Column 5, line 9, for "front" read -- input --.

Signed and sealed this 30th day of March 1965.

(SEAL)
Attest:

ERNEST W. SWIDER
Attesting Officer

EDWARD J. BRENNER
Commissioner of Patents